United States Patent
Kaleta

(10) Patent No.: US 7,469,918 B2
(45) Date of Patent: Dec. 30, 2008

(54) DEFORMABLE KINGPIN

(76) Inventor: Donald J. Kaleta, 4979 Ireland Rd., Rome, OH (US) 44085

( * ) Notice: Subject to any disclaimer, the term of this patent is extended or adjusted under 35 U.S.C. 154(b) by 525 days.

(21) Appl. No.: 10/870,831

(22) Filed: Jun. 17, 2004

(65) Prior Publication Data
US 2005/0006867 A1    Jan. 13, 2005

Related U.S. Application Data

(60) Provisional application No. 60/479,058, filed on Jun. 18, 2003.

(51) Int. Cl.
*B62D 53/06*    (2006.01)
(52) U.S. Cl. ..................................... 280/433
(58) Field of Classification Search ............... 280/433, 280/423.1, 432, 434
See application file for complete search history.

(56) References Cited

U.S. PATENT DOCUMENTS

| | | | |
|---|---|---|---|
| 2,838,324 A | | 6/1958 | Dalton |
| 3,037,794 A | | 6/1962 | Richman, Jr. |
| 3,198,550 A | | 8/1965 | Tuft et al. |
| 3,811,708 A | | 5/1974 | Baaso |
| 4,079,959 A | * | 3/1978 | Vance ................. 280/432 |
| 4,397,474 A | * | 8/1983 | Mettetal ............ 280/476.1 |
| 5,190,342 A | * | 3/1993 | Marlowe et al. .... 296/180.2 |
| 5,630,605 A | * | 5/1997 | Smallwood ......... 280/432 |
| 6,145,864 A | | 11/2000 | Sutherland |

* cited by examiner

*Primary Examiner*—Faye M. Fleming
(74) *Attorney, Agent, or Firm*—Rankin, Hill & Clark LLP

(57) ABSTRACT

A kingpin is provided for use on a trailer in a system with the tractor linked to a trailer. The kingpin includes a shank and a selectively deformable head, whereby during a trailer rollover event, the kingpin head deforms allowing the link between the tractor and trailer to be broken and the tractor to remain upright.

12 Claims, 2 Drawing Sheets

DEFORMABLE KINGPIN

This invention claims the priority of provisional application 60/479,058 filed on Jun. 18, 2003, the entirety of which is incorporated herein.

BACKGROUND OF THE INVENTION

The trucking industry "keeps America moving" and trucking is in fact one of the most important modes of transportation for the movement of goods. Trucks are able to make long hauls or short hauls and can deliver to almost any location accessible by a paved road. Trucking, however, is a dangerous industry for reasons tied to this versatility. Trucks share the nation's roadways with passenger vehicles and pedestrians. Because the size of trucks almost always exceeds other vehicles, truck drivers must be especially careful to observe smaller vehicles and prevent collisions therewith. This is especially true in the case of tractor trailer combinations which exceed a common passenger vehicle's size. The inherent design for the towed trailer is long in length, narrow in width, and commonly uses its capacity to carry heavy loads at a high center of gravity.

Tractor trailer combinations are vulnerable to the phenomenon known as rollover which occurs typically when a truck driver attempts to avoid a collision, or obstacle through a knee jerk impulse reaction. Additionally, rollovers prevalently occur at lane changes and ramp interchanges where excessive speed is used with a change of direction maneuver. The momentum of the trailer does not allow the trailer to follow the new path dictated by the tractor. Instead, the trailer tries to continue in its original path and begins to roll over from an upright position. This is a progressive event which starts at the rear of the trailer and rapidly progresses forward to involve the towing tractor; first its drive axle and continues to involve the forward steer axle which will then have committed the whole combination. The tractor, which is linked to the trailer via a kingpin and fifth wheel system, is actually pulled over by the dominant rolling trailer. Known kingpins include a shank having a circular diameter and an integral head portion also with a circular cross section, but with a larger diameter than the shank. Combination vehicle rollovers destroy the towing tractor, are known to have caused the death of hundreds of tractor occupants and cause vast amounts of serious injuries. Thousands of these events occur annually.

What is desired is a system that allows a towed trailer, within a tractor trailer combination vehicle, to mechanically detach itself from the towing tractor's fifth wheel receiver when the imminent rollover event has committed the towed trailer to roll onto its side, but allows the tractor to remain upright and not follow through to destruction in these events.

SUMMARY OF THE PRESENT INVENTION

The present invention overcomes the problem of tractor rollover by providing an improved kingpin for use on the trailer. During rollover events, the kingpin on the trailer deforms, thus, breaking the link between the kingpin and the fifth wheel on the tractor. As a result the trailer becomes detached from the tractor and the tractor may remain upright even though the trailer rolls onto its side.

In a preferred embodiment of the invention a kingpin is provided for use on a trailer in a system with the tractor linked to the trailer. The kingpin includes a shank and a selectively deformable head, whereby during a trailer rollover event, the kingpin head deforms allowing the link between the tractor and trailer to be broken and the tractor to remain upright.

A method of making a kingpin of the present invention includes the reworking of a known kingpin by removing portions of the head to create two deformable ears.

These and other aspects of the invention are herein described in particularized detail with reference to the accompanying figures.

DETAILED DESCRIPTION OF THE PREFERRED EMBODIMENT

Figure 1:
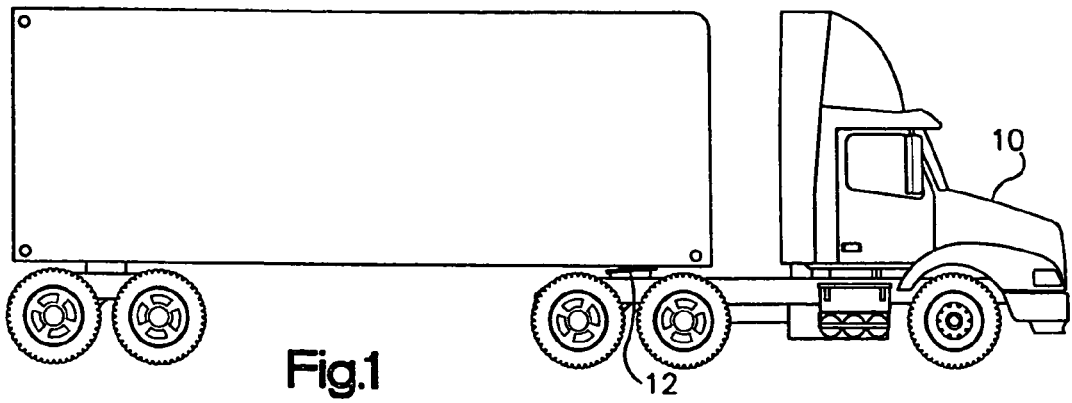
FIG. 1 is a side elevational view of a tractor trailer combination.
Figure 2:
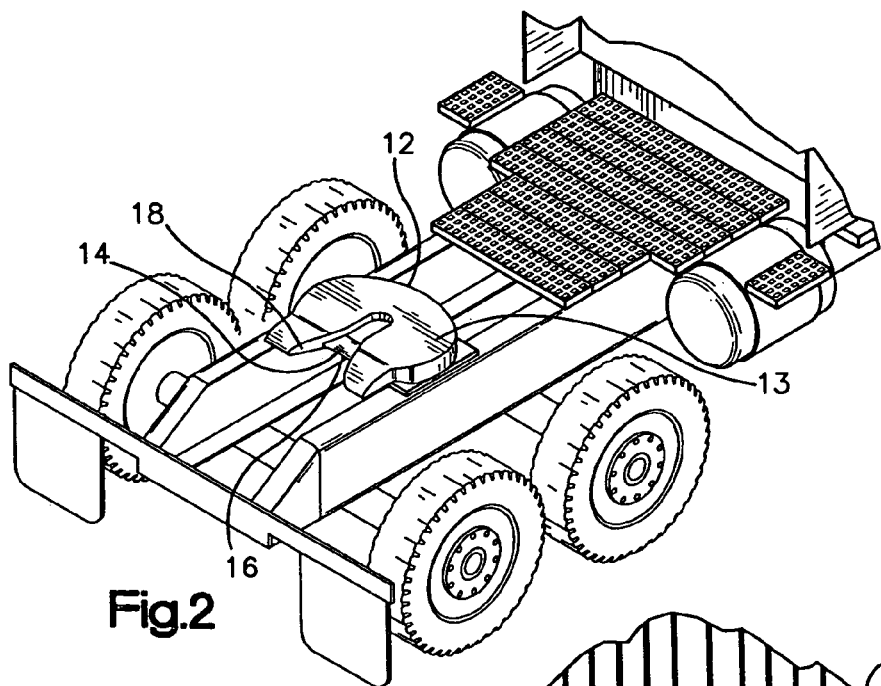
FIG. 2 is a perspective view of a fifth wheel upon the tractor of the tractor trailer combination.

The tractor 10 is shown in FIG. 1 and includes a fifth wheel 12. The fifth wheel 12 is shown in FIG. 2 and includes a V-notch 18, and locking clamp 14 having jaws 16. The fifth wheel 12 has a tear drop shape with an upper contact surface 13 and a V-notch 18 in the narrow portion of the teardrop. Located near the center of the fifth wheel 12 and the apex of the V-notch 18 is the locking clamp 14. The locking clamp 14 includes jaws 16 that move between an open and closed position. The jaws 16, when open, create access from a position within the V-notch 18 of the fifth wheel 12. The jaws 16 each define an inner surface including a semi-circular region that closes over or around the kingpin. The jaws 16 pivot upon individual pins affixed to the fifth wheel 12.

Figure 3:
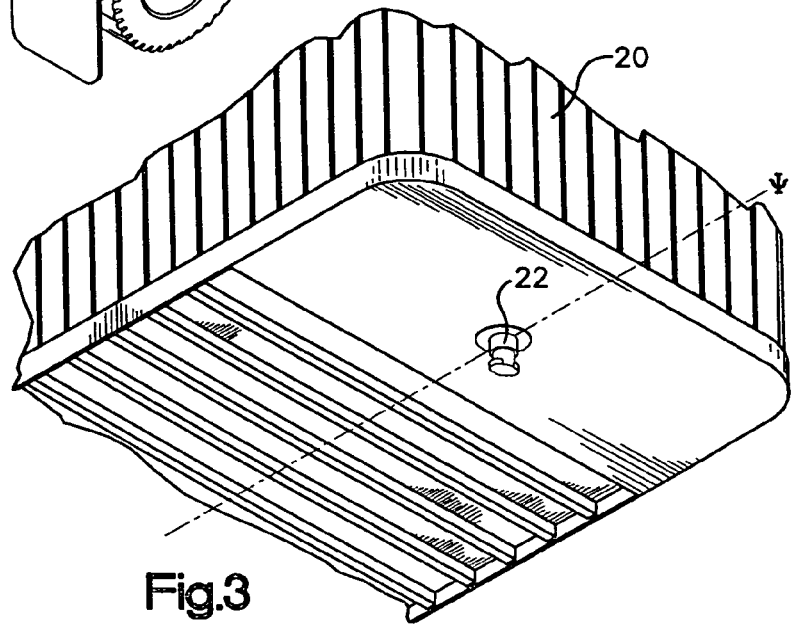
FIG. 3 is a perspective view of a kingpin of the present invention upon the trailer of the tractor trailer combination.
Figure 4:
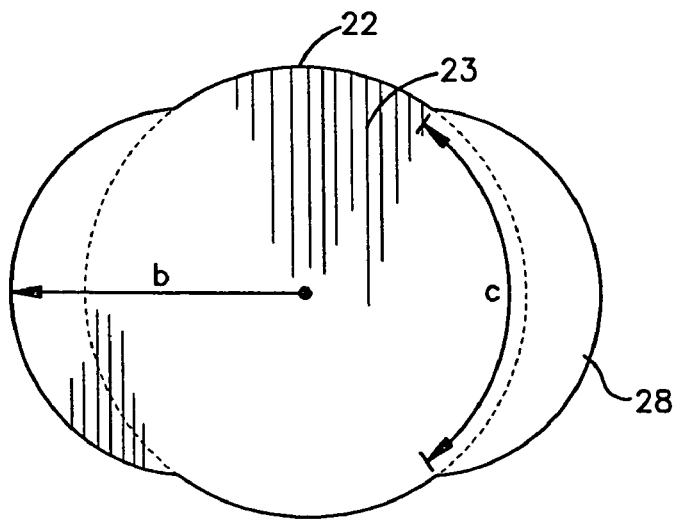
FIG. 4 is a top view of a kingpin of the present invention.
Figure 5A:
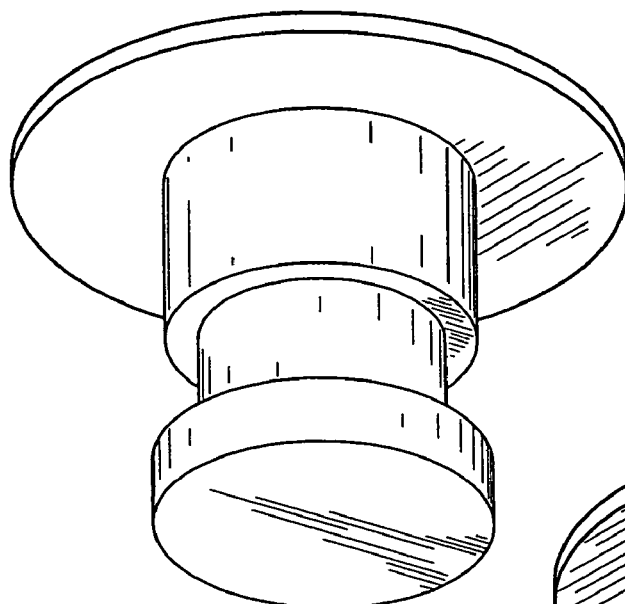
FIG. 5a is a perspective view of a kingpin known in the art.
Figure 5B:
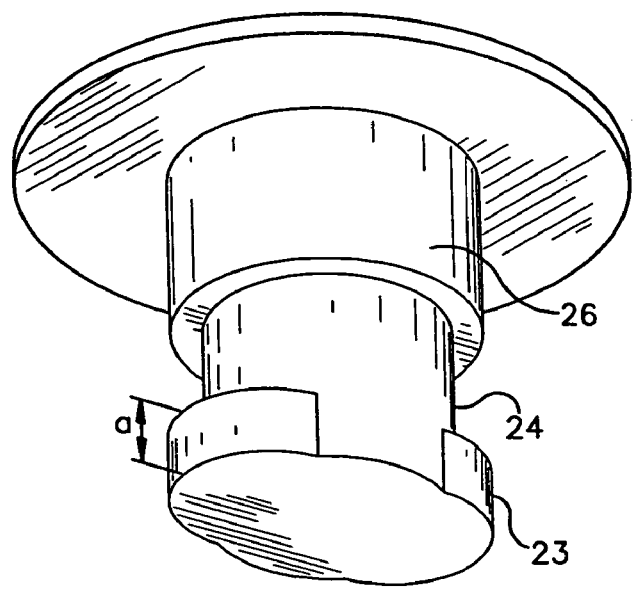
FIG. 5b is a perspective view of a kingpin of the present invention.

Referring to FIGS. 3, 4 and 5b, the trailer 20 includes a kingpin 22 having a head 23, shank 24, and base 26. The kingpin 22 extends vertically downwardly from the bottom of the trailer 20. At an end of the kingpin 22 distal from the body of the trailer 20, a head 23 is provided. The head 23 has a non-circular radial shape (FIG. 5a and 5b show a comparison to a traditional kingpin having a head with a round radial shape). The head 23 includes at least one ear 28 that has a radius greater than the radius of the shank 24. The shank 24 is located adjacent to the head 23 and extends from the head 23 toward the body of the trailer 20. The shank 24 has a generally circular cross sectional shape. The base 26 of the kingpin 22 is located adjacent to the shank 24 and the trailer 20 body and has a generally circular radial shape. Thus, the shank 24 interconnects the base 26 and the head 23. The base 26 has a diameter preferably that exceeds that of the shank 24.

The trailer 20 defines an axis $\Psi$ in a direction extending from the front of the trailer 20 to the rear of the trailer 20. Preferably, a first ear 28 of the kingpin 22 extends in a direction transverse to the $\Psi$ axis. Preferably, a second ear 28 of the kingpin 22 also extends in a direction transverse to the $\Psi$ axis, but opposite to the direction of the first kingpin ear 28. The kingpin 22 is preferably manufactured as an integral whole. The kingpin may be formed by forging, progressive stamping and/or machining operations.

The size of the kingpin ears 28 are determined by the structural strength desired before deformation and/or failure. The parameters of the ears that may be varied include the thickness "a" of the ears 28, the distance "b" the ears 28 protrude from the center of the kingpin and the percentage of overlap "c" on a perimeter defined by an imaginary extension of the kingpin's shank 24. The percentage overlap of a single ear to the entire perimeter of the kingpin is within a range of about fifteen percent to about forty percent. Preferably, the ears 28 are of an equal size and symmetrical. The trailer 20 is any of the known styles, such as tanker, flatbed or van styles.

The fifth wheel 12 functions to hold the kingpin 22 of the trailer 20 and, thus, the trailer 20 in position with respect to the tractor 10. The locking clamp 14 and its jaws 16 close around the shank 24 of the kingpin 22 to hold the trailer 20 in place, while permitting the kingpin 22 and trailer 20 to pivot about the axis/pivot point provided by the fifth wheel. The V-notch 18 of the fifth wheel 12 allows the kingpin 22 to be brought into position within the clamp jaws 16 even when alignment between the tractor 10 and trailer 20 is initially not perfect. The clamp jaws 16 hold the kingpin 22 when in a closed position and release the kingpin 22 when in an open position.

As is well known, the trailer 20 functions to haul goods. The kingpin 22 is a junction and connection point between the tractor 10 and the trailer 20. The shank 24 of the kingpin 22 fits within the jaws 16 of the locking clamp 14 upon the fifth wheel 12. Because the shank 24 is circular the locking clamp 16 of the fifth wheel 12 may spin around the kingpin 22 without resistance. The base 26 of the kingpin 22 functions to prevent excessive downward movement of the trailer 20 with respect to the tractor 10. The head 23 of the kingpin selectively prevents excessive upward movement of the trailer 20 with respect to the tractor 10. However, upon a threshold amount of upward or twisting force applied to the head 23 of the kingpin 22, the head 23 will deform allowing relative movement of the kingpin 22 and fifth wheel 12 sufficient to break the link therebetween.

In a manner well known in the art, the fifth wheel 12 is affixed to the tractor 10. The notch 18 on the fifth wheel 12 points towards the rear of the tractor 10. The kingpin 22 is attached to the trailer 20 such that it extends downwardly therefrom. The kingpin 22 is attached to a deck plate on the trailer, typically by welding. The shank 24 of the kingpin 22 fits into the clamp jaws 16 of the fifth wheel's locking clamp 14.

In a manner well known in the trucking art, the tractor 10 is linked to the trailer 20 by backing the tractor 10 into position with respect to the trailer 20 such that the kingpin 22 is aligned within the fifth wheel 12. The locking clamp 14 on the fifth wheel 12 is then closed about the kingpin shank 23, and the tractor trailer is ready for operation. During normal operation the kingpin 22 is free to spin within the locking clamp 14 as the tractor trailer combination makes turns on the road.

During potential rollover situations, an atypical upward or twisting force is applied by the trailer 20 to the tractor 10 via the kingpin 22 that initiates the rollover. During the rollover, a progressive shift of orientation of the trailer causes a twisting force in the fifth wheel and kingpin joint. The rollover mechanics are different than those in an automobile rollover. The rear end of the trailer may rotate a full ninety degrees, such that the rear wheels of the trailer are off the road while all wheels of the tractor remain on the road. The twisting force inherent in this juxtaposition progresses from the rear to the front of the trailer into the fifth wheel/kingpin joint. The twisting force is transmitted by the head of the kingpin 22 against the locking clamp 14 of the fifth wheel 12. More specifically, one of the kingpin ears 28 will be brought upwardly into engagement with the fifth wheel clamp while the other kingpin ear will be forced downwardly away from the fifth wheel clamp.

Depending on which way the trailer 20 rolls, force exceeding a deformation threshold is applied to either one or the other of the ears 28 upon the kingpin head 23. When the threshold force is exceeded, a first ear and then possibly a second ear 28 on the kingpin head 23 deform in such a way as to allow the kingpin 22 to move out of the hold of the locking clamp 14. Deformation may include a full sheering off of one or both of ears 28. As a result, the trailer 20 is free to rollover while the tractor 10 remains in an upright position.

This designed failure prevents completion of a full rollover, where typically the tractor steering axle leaves the ground after the tractor frame is twisted and lifted to a forty five degree angle.

Although the kingpin head 23 is preferably manufactured with a non-circular radial shape, existing circular kingpins 22 may be reworked by removing portions of the head such as by grinding or machining. Further, instead of changing the shape of the head, a similar result may be achieved by cutting slots through the head so as to weaken the head to permit deformation or shearing thereof. Thus, with knowledge of the present invention, various equivalent structures may be derived by those skilled in the art.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A kingpin for use on a trailer in a system with a tractor linked to the trailer, the kingpin comprising:
   a shank; and
   a selectively deformable head, whereby during a trailer rollover event, the kingpin head deforms allowing the link between the tractor and trailer to be broken and the tractor to remain upright.

2. The kingpin of claim 1 wherein the selectively deformable head comprises two ears.

3. The kingpin of claim 2 wherein the two ears extend outwardly from opposite sides of the shank in a direction transverse to an axis running from the front to the rear of the trailer.

4. The kingpin of claim 1 further including a base adjacent to the shank.

5. The kingpin of claim 2 wherein each ear is integral with about thirty five percent of a perimeter defined by an imaginary extension of the shank.

6. A trailer for use in a system with a tractor linked to the trailer, the trailer including a kingpin comprising:
   a shank; and
   a selectively deformable head, whereby during a trailer rollover event, the kingpin head deforms allowing the link between the tractor and trailer to be broken and the tractor to remain upright.

7. A method of reworking a kingpin having a head with a circular shape into a kingpin that allows a link between a tractor and trailer to be broken and the tractor to remain upright during a trailer rollover event comprising the step of removing two sections on the head of a kingpin to create a head with deformable ears.

8. The kingpin of claim 2 wherein at least one of the ears deforms upon the application of a predetermined force.

9. A method for separating a tractor from a trailer during a rollover event comprising the steps of:

providing the trailer with a selectively deformable head; and deforming the head during a trailer rollover event, allowing the link between the tractor and trailer to be broken and the tractor to remain upright.

10. The kingpin of claim 1 wherein the selectively deformable head deforms upon the application of a predetermined force, wherein the predetermined force is a force caused by the trailer rollover event.

11. The trailer of claim 1 wherein the selectively deformable head deforms upon the application of a predetermined force, wherein the predetermined force is a force caused by the trailer rollover event.

12. The method of claim 9, wherein the trailer rollover event causes a force within a predetermined range to act on the kingpin and the selectively deformable head, and the head deforms upon application of the force within the predetermined range to allow the link between the tractor and trailer to be broken and the tractor to remain upright.

* * * * *